3,182,083
BICYCLO [3.3.0] OCTANE SUBSTITUTED AMIDES
Rostyslaw Dowbenko, Gibsonia, Pa., assignor to The Pittsburgh Plate Glass Company, Pittsburgh, Pa., a corporation of Pennsylvania
No Drawing. Filed Feb. 21, 1963, Ser. No. 260,314
8 Claims. (Cl. 260—561)

This invention relates to derivatives of bicyclo[3.3.0]-octane, and more particularly to such derivatives formed by transannular cycloadditions to 1,5-cyclooctadiene.

It is known that cyclic alkenes, such as cyclohexene, form 1 to 1 addition products with various reactive compounds. For example, the reaction of cyclohexene with carbon tetrachloride produces 1-trichloromethyl-2-chlorocyclohexane. It would be expected, therefore, that compounds such as 1,5-cyclooctadiene would produce a mixture of 1 to 1 and 1 to 2 adducts having similar structures.

It has been found, however, that 1,5-cyclooctadiene does not undergo simple addition reactions in many instances and that the reaction of 1,5-cyclooctadiene with carboxylic acid amides results in a transannular rearrangement to produce bicyclo[3.3.0]octane derivatives.

The bicyclo[3.3.0]octane derivatives to which this invention relates and which are produced as a result of the reaction of 1,5-cyclooctadiene with amides comprise compounds in which a bicyclo[3.3.0]octyl group is substituted for a hydrogen atom in the amide. The amide residue is attached to the bicyclo[3.3.0]octane nucleus in the 2-position. In many instances several distinct products are obtained with various hydrogen atoms of the amide being replaced by the bicyclo[3.3.0]octyl group. One product is derived by replacing the hydrogen which is either attached directly to the carbonyl carbon atom, in the case of formamides, or which is attached to the carbon atom next to the carbonyl carbon, in the case of aliphatic carboxylic acid amides. These products can be represented by the formula:

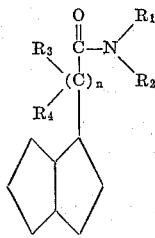

where $n$ is an integer from 0 to 1 and $R_1$, $R_2$, $R_3$ and $R_4$ are hydrogen or alkyl; preferably at least one of $R_1$ and $R_2$ is lower alkyl, i.e., having up to about 8 carbon atoms, while at least one of $R_3$ and $R_4$ is hydrogen and the other hydrogen or lower alkyl. In certain instances, for instance in the case of N-t-butyl-substituted amides, this product is substantially the only product, presumably due to steric factors.

Generally, however, another novel type of product is also obtained in which the bicyclo[3.3.0]octyl group is attached to the nitrogen atom of the amide or to the carbon atom next to the nitrogen atom, depending upon factors analogous to those discussed above. This class of products can be represented as follows:

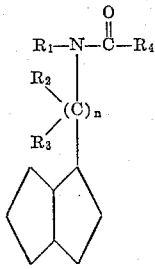

where $n$ is an integer from 0 to 1 and $R_1$, $R_2$, $R_3$ and $R_4$ are hydrogen or alkyl, preferably hydrogen or lower alkyl.

Among the amides which react with 1,5-cyclooctadiene to produce the aforesaid compounds are formamide, dimethylformamide, t-butylformamide, N,N,-dimethylacetamide, t-butylacetamide, propionamide, t-butylproprionamide, N,N,-ethylmethylacetamide, ethyl valeramide, and other carboxylic acid amides of the formula:

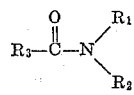

in which $R_1$, $R_2$ and $R_3$ preferably are hydrogen or alkyl of up to about 8 carbon atoms.

The reaction conditions used to produce the bicyclo-[3.3.0]octane derivative from the amide and 1,5-cyclooctadiene are not critical. For instance, no solvent is necessary, although one can be employed if desired. Similarly, the ratio of reactants does not affect operability of the reaction, although better yields are obtained if an excess of the amide is present, and it is for this reason that a substantial stoichiometric excess of the amide is ordinarily utilized. Usually at least about 5 moles of amide per mole of 1,5-cyclooctadiene are present.

In general, the reaction should be carried out under conditions such that free radical catalyzed additions take place. A catalyst as such is not always necessary, but when a catalyst is not employed, elevated temperatures 100° C. or higher, and preferably 150 to 250° C., should be employed. Alternatively, a free radical-producing catalyst may be utilized. Among the catalysts which are used are peroxides, azo compounds such as azobis(isobutyronitrile), ultraviolet light, and similar known free radical-producing catalysts.

When a catalyst is present, the preferred temperature is that at which the catalyst yields free radicals at an appreciable rate. This temperature varies with the particular catalyst, for example, when using benzoyl peroxide the temperature should be about 70° C. or higher; with azobis(isobutyronitrile), 50° C. or higher; with di(tertiarybutyl)peroxide, 120° C. or higher; while with ultraviolet light catalysis room temperature is often satisfactory. Temperatures lower than those set forth may be employed but tend to result in an undesirably slow rate of reaction.

The amount of catalyst is not critical and may be varied widely, with at least about 0.02 mole percent based on the 1,5-cyclooctadiene being ordinarily employed.

Set forth below are several examples which will serve to illustrate the method and practice of the invention.

EXAMPLE 1

*Reaction of 1,5-cyclooctadiene with dimethylformamide*

A mixture of 108.2 grams of 1,5-cyclooctadiene and 14.6 grams of di-t-butyl peroxide was added over a period of 12 hours to a reaction vessel containing 2190 grams of dimethylformamide at 135 to 140° C. The reaction mixture was heated for 48 hours and then distilled to remove the unreacted dimethylformamide. The remaining liquid was then redistilled and the fraction boiling at 83 to 85° C. at 0.10 millimeter pressure was identified as a mixture of exo,cis-N,N-dimethylbicyclo[3.3.0]octane-2-carboxamide and N-(exo,cis-bicyclo[3.3.0]octane-2-methyl)-N-methylformamide, having the following structures respectively:

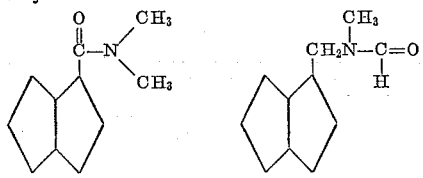

The products were identified by gas chromatographic, infrared, and chemical analyses, as well as by characterizing chemical reactions.

Analysis (calculated for $C_{11}H_{19}NO$):

|   | Calculated, Percent | Found, Percent |
|---|---|---|
| C | 72.88 | 74.31 |
| H | 10.56 | 9.91 |
| N | 7.73 | 6.69 |

EXAMPLE 2

*Reaction of 1,5-cyclooctadiene with tertiary-butylformamide*

A mixture of 35.6 grams of 1,5-cyclooctadiene and 5.11 grams of ditertiarybutyl peroxide were added over a period of 12 hours to 1010 grams of tertiary-butylformamide while maintaining the mixture at 135 to 140° C. Heating was continued for an additional 24 hours and then the mixture was distilled. There was obtained 35 grams of a fraction boiling at 115° C. at 0.08 millimeter to 165° C. at 0.25 millimeter which crystallized on standing. This solid was recrystallized from petroleum ether, aqueous ethanol and aqueous methanol, whereby there was obtained 31 grams of exo,cis-N-tertiary-butylbicyclo[3.3.0]octane-2-carboxamide, melting point 134 to 135° C. This compound, which was identified by infrared and chemical analysis, had the following structure:

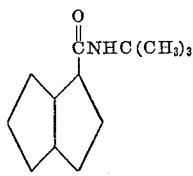

Analysis (calculated for $C_{13}H_{23}NO$):

|   | Calculated, Percent | Found, Percent |
|---|---|---|
| C | 74.70 | 75.01 |
| H | 11.09 | 10.36 |
| N | 6.70 | 6.70 |

EXAMPLE 3

*Reaction of 1,5-cyclooctadiene with N,N-dimethylacetamide*

A mixture of 108.5 grams of 1,5-cyclooctadiene and 14.6 grams of ditertiarybutyl peroxide was added slowly to 870 grams of N,N-dimethylacetamide at 135 to 140° C. over a 14-hour period. The mixture was then allowed to cool slowly and stand overnight. Upon several redistillations there was obtained 17.4 grams of a fraction boiling at 91 to 93° C. at 0.15 millimeter, which was identified as N,N - dimethylbicyclo[3.3.0]octane - 2 - acetamide, having the structure:

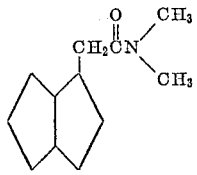

Analysis (calculated for $C_{12}H_{21}NO$):

|   | Calculated, Percent | Found, Percent |
|---|---|---|
| C | 73.80 | 75.37 |
| H | 10.84 | 10.45 |
| N | 7.17 | 6.03 |

The compounds produced in accordance with this invention can be used for various purposes. For example, they are useful as plasticizers for resinous compositions. They are also valuable chemical intermediates and can be used to produce compounds such as the corresponding carboxylic acids, for example, by hydrolysis reactions.

They are also valuable pesticides. The products from dimethylformamide, for example, are nematocides, effectively destroying nemotodes such as Panagrellus in concentrations varying from 0.1 to 0.01 percent.

According to the provisions of the patent statutes, there are described above the invention and what are now considered to be its best embodiments. However, within the scope of the appended claims, it is to be understood that the invention may be practiced otherwise than as specifically described.

I claim:

1. The method of producing bicyclo[3.3.0]octane substituted amides which comprises reacting 1,5-cyclooctadiene with a carboxylic acid amide selected from the group consisting of

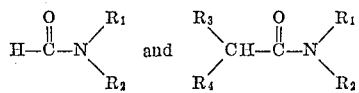

in which $R_1$, $R_2$, $R_3$, and $R_4$ are selected from the class consisting of hydrogen and alkyl having up to 8 carbon atoms, and at least one of $R_3$ and $R_4$ is hydrogen.

2. The method of claim 1 in which a stoichiometric excess of said amide is present.

3. The method of claim 1 in which the reaction is carried out in the absence of a catalyst at a temperature of at least about 100° C.

4. The method of claim 1 in which the reaction is carried out in the presence of a free radical-producing catalyst selected from the group consisting of peroxide and azo compounds, and at a temperature at which the said catalyst yields free radicals at an appreciable rate.

5. The method of producing bicyclo[3.3.0]octane substituted amides which comprises reacting 1,5-cyclooctadiene with an N-lower alkyl substituted formamide, said alkyl having up to 8 carbon atoms.

6. The method of producing bicyclo[3.3.0]octane substituted amides which comprises reacting 1,5-cyclooctadiene with an N-lower alkyl-substituted acetamide, said alkyl having up to 8 carbon atoms.

7. A compound of the formula:

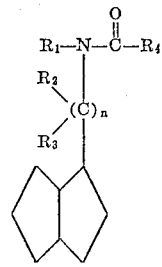

where $R_1$, $R_2$, $R_3$ and $R_4$ are selected from the class consisting of hydrogen and alkyl having up to 8 carbon atoms and $n$ is an integer from 0 to 1.

8. A compound of the formula:

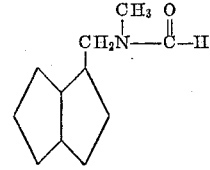

No references cited.

IRVING MARCUS, *Primary Examiner.*

NICHOLAS S. RIZZO, WALTER A. MODANCE, *Examiners.*